United States Patent [19]
Sayama

[11] Patent Number: 5,722,517
[45] Date of Patent: Mar. 3, 1998

[54] BRAKE APPARATUS OF A MOTOR VEHICLE EQUIPPED WITH AUTOMATIC TRANSMISSION

[75] Inventor: Osamu Sayama, Tochigi, Japan

[73] Assignees: Mitsubishi Jidosha Kogyo Kabushiki Kaisha; Mitsubishi Jodosha Engineering Kabushiki Kaisha, both of Tokyo, Japan

[21] Appl. No.: 707,419

[22] Filed: Sep. 4, 1996

[30] Foreign Application Priority Data

Sep. 4, 1995 [JP] Japan ............... 7-226625

[51] Int. Cl.$^6$ ............... B60T 17/16; B60T 11/00; B60K 41/26
[52] U.S. Cl. ............... 188/353; 192/4 A; 303/89
[58] Field of Search ............... 188/170, 265, 188/353, 361; 192/4 A, 4 R, 7, 9; 180/287; 303/3, 89

[56] References Cited

U.S. PATENT DOCUMENTS

| | | | |
|---|---|---|---|
| 2,864,469 | 12/1958 | Schluurbrecht | 188/353 |
| 3,299,999 | 1/1967 | Martiu | 192/4 A |
| 3,565,220 | 2/1971 | Lammers | 192/4 A |
| 3,735,834 | 5/1973 | St. Onge | 303/89 |
| 3,973,805 | 8/1976 | Stevenson et al. | 303/89 |
| 4,246,989 | 1/1981 | Kohler | 192/4 A |
| 4,454,936 | 6/1984 | Wise | 192/4 A |
| 4,462,487 | 7/1984 | Warwick et al. | 192/4 A |
| 4,519,653 | 5/1985 | Smith | 188/353 |
| 4,884,668 | 12/1989 | Kobayashi et al. | 192/4 A |
| 5,570,756 | 11/1996 | Hatcher | 188/353 |

Primary Examiner—Lee W. Young
Assistant Examiner—Chris Schwartz

[57] ABSTRACT

A brake apparatus of a motor vehicle equipped with an automatic transmission includes a brake circuit for applying a fluid pressure to wheel brakes to allow the wheel brakes to generate braking forces. The hydraulic pressure is generated by fluid pressure generating means according to an operated state of a brake pedal. The brake apparatus further includes a shift operating unit having a selector member that is placed in a selected shift position including a parking position for establishing a selected shift position of the automatic transmission. A control valve is disposed between the fluid pressure generating means and the wheel brakes in the brake circuit, such that the control valve is selectively placed in a first state wherein the wheel brakes communicate with the fluid pressure generating means, and a second state wherein the wheel brakes are disconnected from the fluid pressure generating means. The control valve is placed in the second state when the selector member is moved into the parking position, and placed in the first state when the selector member is moved into a shift position other than the parking position.

1 Claim, 3 Drawing Sheets

BRAKE APPARATUS OF A MOTOR VEHICLE EQUIPPED WITH AUTOMATIC TRANSMISSION

BACKGROUND OF THE INVENTION

The present invention relates to a brake apparatus of a motor vehicle equipped with an automatic transmission, and particularly to a parking brake system of the motor vehicle which is suitably used in a heavy-load vehicle, such as a large-sized truck.

In a relatively light-load vehicle, such as a passenger car or a small-sized truck, which is equipped with a hydraulically-operated automatic transmission, a shift operating unit is conventionally provided with a parking position. When a shift lever is moved into the parking position, rotating members of the transmission are mechanically locked by a parking member or members incorporated in the automatic transmission, so that the whole drive system or power transmitting system is restrained so as to fix drive wheels. In this manner, a parking brake is established.

If a similar parking brake system is installed in a heavy-load vehicle, however, the parking member or members may not be easily disengaged from the rotating members due to a large load applied to the parking member or members in the transmission, when a driver attempts to move the shift lever from the parking position to another position to release the parking brake. In view of this problem, the above type of the parking brake system is not employed in heavy-load vehicles, such as a middle- or large-sized trucks, or various other vehicles, such as a work vehicle.

In the meantime, a motor vehicle equipped with a PTO (Power Take Off) mechanism is often used such that an external equipment is driven by a vehicle engine while the vehicle is parked. It is, therefore, desirable that the vehicle can be securely parked while the transmission is being placed in a neutral position.

Further, automatic transmissions for passenger cars having the foregoing parking brake is widely used today. Therefore, it is desirable from the standpoint of uniformity of the operation that a shift lever having the parking position is also provided in the middle- or large-sized truck or vehicle, so that the shift lever may be placed in the parking position when parking the vehicle. It is, however, difficult to provide a parking brake system, similar to that of a passenger vehicle, in an automatic transmission for a heavy-load vehicle for the mechanical problems as described above.

OBJECT AND SUMMARY OF THE INVENTION

In the light of the above problems, it is an object of the present invention to provide a parking brake apparatus which is applicable to a heavy-load vehicle, such as a middle- or large-sized truck, and which permits an automatic transmission of the heavy-load vehicle to be operated in the same manner as that of a passenger car.

The above object may be accomplished according to one aspect of the present invention, which provides a brake apparatus of a motor vehicle equipped with an automatic transmission, comprising: a brake circuit for applying a fluid pressure to wheel brakes to allow the wheel brakes to generate braking forces, the fluid pressure being generated by a fluid pressure generating unit according to an operated state of a brake pedal; a shift operating unit including a selector member that is placed in a selected one of shift positions including a parking position for establishing a selected one of shift positions of the automatic transmission; and a control valve disposed between the fluid pressure generating unit and the wheel brakes in the brake circuit, the control valve being selectively placed in a first state wherein the wheel brakes communicate with the fluid pressure generating unit, and a second state wherein the wheel brakes are disconnected from the fluid pressure generating means. The control valve is placed in the second state when the selector member is moved into the parking position, and placed in the first state when the selector member is moved into a shift position other than the parking position.

In the present brake apparatus constructed as described above, the control valve is switched to the second state when the selector member is moved into the parking position while the fluid pressure is built up in the brake hydraulic circuit with the brake pedal being depressed after stopping of the vehicle. As a result, the fluid pressure is trapped and maintained in the brake hydraulic circuit so as to keep the wheel brakes in the braking condition, thereby to establish a parking brake.

Preferably, the brake apparatus of the present invention may further include a pressure detector for detecting a pressure between the wheel brakes and the control valve in the brake circuit, and an annunciator for generating an alarm when the selector member is moved into the parking position and the pressure detected by the pressure detector is smaller than a predetermined level. This annunciator generates an alarm when the fluid pressure decreases to a level smaller than the predetermined level due to some defect in the brake circuit during parking of the vehicle, or when the fluid pressure in the brake circuit is smaller than the predetermined level, since the brake pedal is weakly or not sufficiently depressed when the selector member is moved into the parking position. In this manner, the annunciator informs a driver or other vehicle passenger of lack of the braking force.

It is also preferable that a mechanically operating system be provided independently of the brake circuit, for mechanically activating the wheel brakes and in a braking direction when a parking brake lever is operated. In this arrangement, the braking force produced by the mechanically operated system is advantageously combined with the braking force of the wheel brakes due to the fluid pressure of the brake circuit as described above, so that a double braking force or effort can be obtained during parking of the vehicle.

In another preferred form of the brake apparatus of the invention, the shift operating unit includes a lock mechanism for restricting movement of the selector lever into one of the shift positions other than the parking position when the selector lever is placed in the parking position. When this brake apparatus is installed in a vehicle with a PTO (Power Take Off) mechanism, for example the selector lever may be prevented from being inadvertently moved from the parking position even when any equipment or instrument of the vehicle is driven using the engine power while the vehicle is being stopped.

The same object may be accomplished according to another aspect of the present invention, which provides a braking apparatus of a motor vehicle equipped with an automatic transmission, comprising: a spring chamber including a spring for biasing a wheel brake in a direction in which the wheel brake applies a braking force to a corresponding wheel, the spring chamber inhibiting the wheel brake from applying the braking force against a bias force of the spring, upon application of a pneumatic pressure from a compressed air supply to the spring chamber; a shift operating unit including a selector member that is placed in a selected one of shift positions including a parking position for establishing a selected one of shift positions of the automatic transmission; and a control valve disposed between the compressed air supply and the spring chamber, the control valve being selectively placed in a first state wherein the spring chamber communicates with the compressed air supply, and a second state wherein an air in the spring chamber is discharged. The control valve is placed in the second state when the selector member is moved into the parking position, and placed in the first state when the selector member is moved into one of the shift positions other than the parking position.

In operation of the braking apparatus constructed as described above, the control valve is switched to the second state if the selector member is moved into the parking position after stopping of the motor vehicle. With the control valve placed in the second state, the air in the spring chamber is discharged so that the spring of the spring chamber maintains a corresponding wheel brake in the braking condition, thereby to establish a parking brake.

In the brake apparatus as described just above, the control valve preferably includes an operating portion that is mechanically moved along with the selector member so that the control valve is switched to the second state when the selector member is moved into the parking position, and switched to the first state when the selector member is moved into a shift position other than the parking position. In this case, a hand control valve used in a wheel-parking system including a conventional spring chamber may be readily employed as the control valve since its operating portion is mechanically moved with the selector member. The use of the hand control valve does not require a significant change in designing the wheel-parking system.

DETAILED DESCRIPTION OF THE PREFERRED EMBODIMENTS

Figure 1:
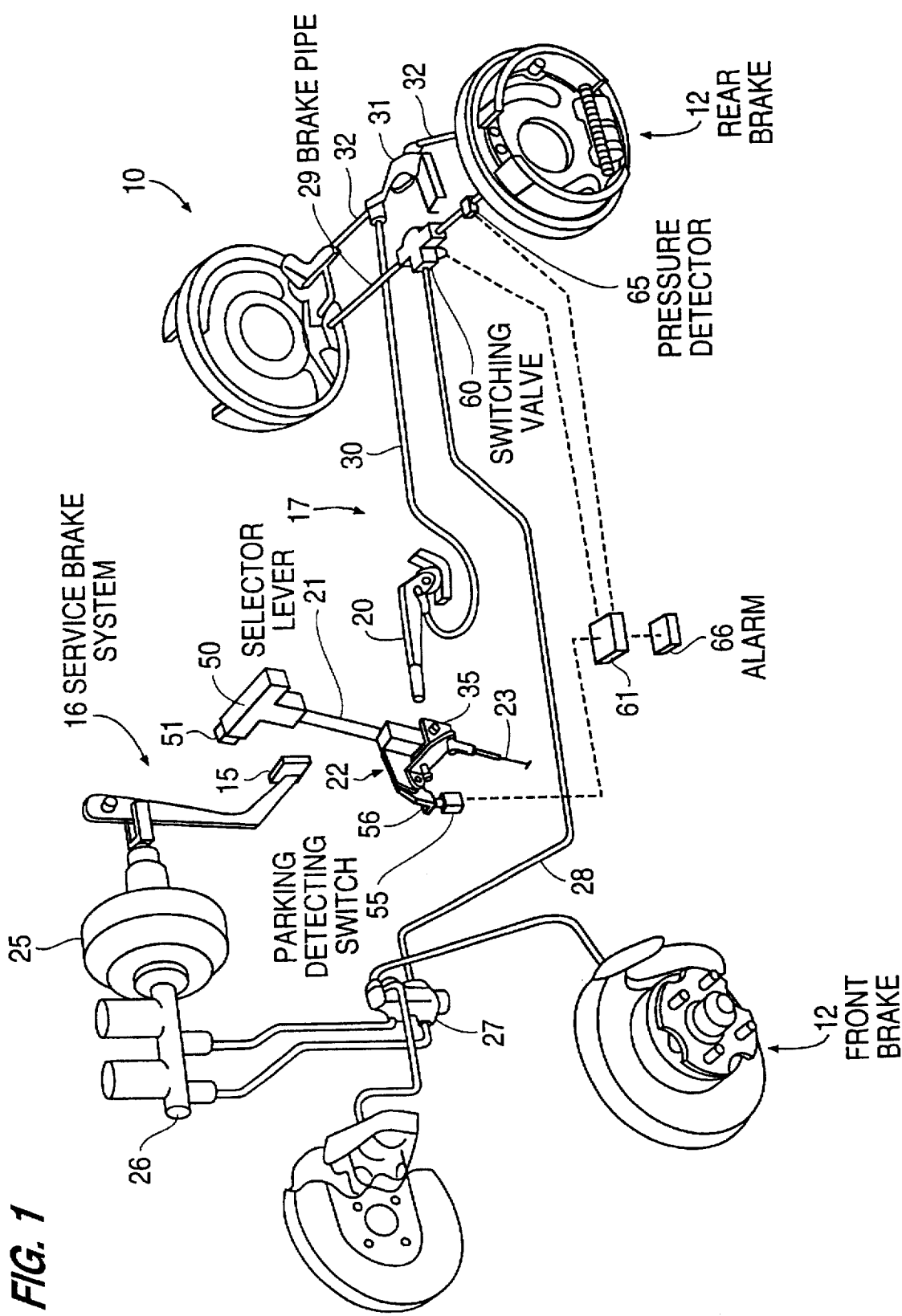
FIG. 1 is a perspective view showing a brake apparatus constructed according to one embodiment of the present invention.
Figure 2:
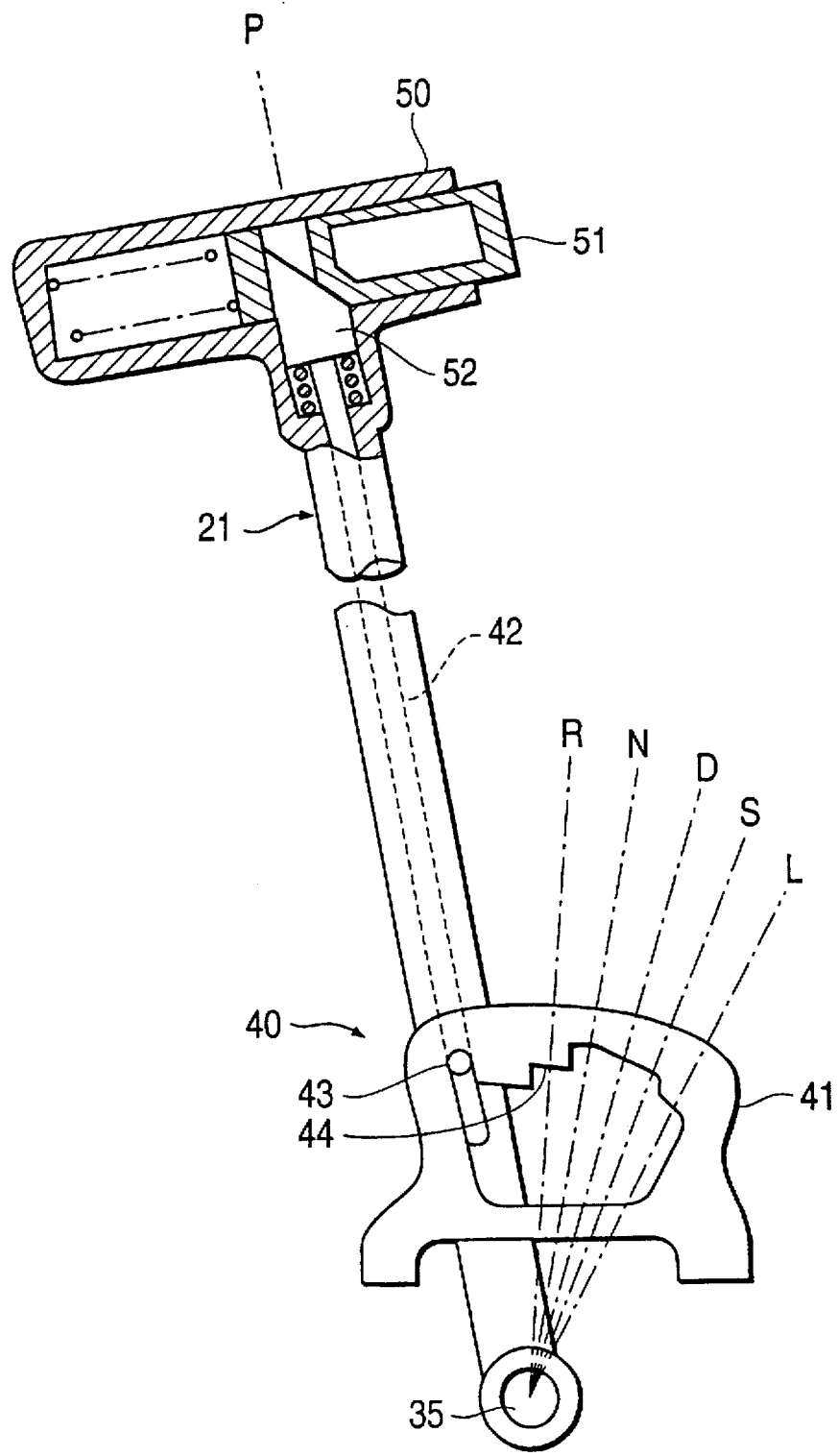
FIG. 2 is a side view showing a cross section of a part of a shift operating unit used in the brake apparatus of FIG. 1.

Referring to FIGS. 1 and 2, there will be described in detail one preferred embodiment of the present invention.

FIG. 1 shows one example of a brake apparatus of a motor vehicle on which an automatic transmission is installed. This brake apparatus includes front brakes 11, such as disc brakes, disposed on the side of front wheels, and rear brakes 12 disposed on the side of rear wheels. While an example of the rear brake 12 is a drum brake incorporating a wheel parking system, a disc brake may be also used as the rear brake 12.

This brake apparatus 10 includes a service brake system 16 that produces braking forces upon depression of a brake pedal 15, and a parking brake system 17 that is used when the vehicle is stopped or parked. The parking brake system 17 can be operated by manipulating a parking brake lever 20 as described later. A selector lever 21 is provided at a shift operating unit 22 of the vehicle, for connection with a control cable 23 for controlling an automatic transmission (not shown) according to a selected position of the lever 21.

An example of the service brake system 16 is a hydraulic brake system that is operated by a hydraulic pressure, which includes a booster 25, a master cylinder 26, a proportioning valve 27 and brake pipes 28, 29, as known in the art. Upon depression of the brake pedal 15, the hydraulic pressure generated in the master cylinder 26, according to the depressing force, is distributed to the front brakes 11 and rear brakes 12, so that these brakes 11, 12 generate braking forces at the same time.

The parking brake system 17 is constructed similarly to a known mechanical parking brake system, and includes the parking brake lever 20, a brake cable 30 connected to the parking brake lever 20, a force transmitting mechanism 31, brake operating members 32, and others. In operation, the force produced when the brake cable 30 is pulled by the parking brake lever 20 is transmitted to the brake operating members 32, so that the rear brakes 12 apply braking forces to the rear wheels.

The selector lever 21 is pivotable about a supporting point 35 in the front-to-rear direction of the vehicle. This selector lever 21 is placed in a selected one of neutral position N, reverse position R, drive position D, parking position P, low position L, and second range S, for example. The reverse position R and drive position D are located on the front side and rear side of the neutral position N, respectively, and the parking position P is located on the front side of the reverse position R. The second position S and a third position (not shown) or the like if necessary are provided on the rear side of the drive position D, and the low position L is the rearmost position of the selector lever 21.

The selector lever 21 is provided with a lock mechanism 40 as illustrated in FIG. 2, so that the lever 21 can be locked by this mechanism 40 depending upon the selected position and the direction in which the lever 21 is moved. The lock mechanism 40 shown in FIG. 2 includes a detent plate 41, and a push rod 42 that is inserted through the inside of the selector lever 21 such that the rod 42 can be raised and lowered within the lever 21. The push rod 42 is provided at its lower end with a lever pin 43, which is moved up and down with the rod 42 for engagement with an engaging groove 44 of the detent plate 41.

The selector lever 21 is provided at its upper end with a grip 50, which has an operating member 51 and a cam member 52. The cam member 52 is lowered when a driver pushes the operating member 51 with a finger. The cam member 52 is disposed at the upper end of the push rod 42 such that the push rod 42 comes down when the cam member 52 is lowered, whereby the lever pin 43 is disengaged from the engaging groove 44.

The above-indicated lock mechanism 40 is constructed such that the selector lever 21 cannot be moved when the lever 21 is shifted from the neutral position N toward the reverse position R unless the operating member 51 is pushed to disengage the lever pin 43 from the engaging groove 44. The selector lever 21 cannot be also moved when the selector lever 21 is shifted from the reverse position R to the parking position P and from the parking position P to the reverse position R, unless the operating member 51 is pushed to release the engagement between the lever pin 43 and the engaging groove 44. When the selector lever 21 is shifted between the drive position D and the neutral position N, the selector lever 21 can be moved without pushing the operating member 51.

The shift operating unit 22 is provided with a switch 55 as an example of parking detecting means. When the selector lever 21 is shifted from the reverse position R to the parking position P, this switch 55 is pushed down by a base portion 56 of the lever 21 to be thereby turned on, that is, switched from the OFF state to the ON state, for example.

The brake pipe 29 of the rear brakes 12 is provided with a switching valve 60 that is operated by an electrically-driven actuator, such as a solenoid. This switching valve 60 is closed in accordance with a command generated from a controller 61 in response to an electric signal produced by the switch 55 when the selector lever 21 is placed in the parking position P.

The brake pipe 29 is also provided with a pressure detector 65, such as a pressure switch, which is adapted to send to the controller 61 a signal as to whether the pressure in the brake pipe 29 reaches a predetermined level or not. The controller 61 activates an annunciator or alarm 66 as an example of signaling means for turning on an alarm lamp or generating warning sound, if the pressure of the brake pipe 29 is below the predetermined level when the selector lever 21 is placed into the parking position P and the switch 55 is activated.

There will be then described an operation of the braking apparatus constructed as described above.

If the brake pedal 15 is depressed while the vehicle is running, the braking forces are concurrently generated in the front brakes 11 and rear brakes 12, due to the hydraulic pressure generated in the master cylinder 26 of the service brake system 16, so that the vehicle is decelerated or stopped.

While the vehicle is being stopped, the hydraulic pressure is developed in the brake pipes 28, 29 by depressing the brake pedal 15. And the selector lever 21 is operated to the parking position P, the parking detecting switch 55 is activated, and the switching valve 60 is thereby closed to maintain the hydraulic pressure in the brake pipe 29, which pressure has been applied from the master cylinder 26 of the service brake system 16. Thus, the braking forces of the rear brakes 12 can be kept applied to the rear wheels. If the brake cable 30 is then pulled by pulling up the parking brake lever 20, the brake operating members 32 are moved in braking directions for applying brakes, thus assuring double parking performance.

If the hydraulic pressure of the brake pipe 29, which is supposed to be maintained at a level same as the level at a time when the switching valve 60 is closed as described above, becomes lower than the predetermined level for some reason, the annunciator 66 is activated based on the signal generated by the pressure detector 65, to inform a vehicle passenger that the braking pressure has been reduced. The lack of pressure in the brake pipe 29 is also detected by the pressure detector 65 when the brake pedal 14 is weakly depressed while the selector lever 21 is operated to the parking position P to close the switching valve 60. In this case, too, the annunciator 66 can inform the vehicle passenger of the lack of the braking pressure.

The brake apparatus 10 constructed as described above may be advantageously installed on heavy-load vehicles, such as middle- or large-sized trucks, various work vehicles and industrial vehicles, since the selector lever 21 of such a vehicle can be placed in the parking position P. Thus, the selector lever 21 of the above-kind of vehicle can be operated as if that of a passenger car were operated, so that a sufficiently large braking force is applied to the wheels during parking of the vehicle.

While the switching valve 60 is provided in the hydraulic service brake system 16 in the illustrated embodiment, the present invention is also applicable to a vehicle equipped with an air brake system. In the case of the vehicle equipped with the air brake system, the switching valve 60 and the pressure detector 65 are provided in a brake pipe for supplying the air, which pipe is connected to a known brake chamber (a device for moving brake shoes in the braking direction due to the pressure of compressed air). When the selector lever 21 is operated to the parking position P, the switching valve 60 is closed in response to a signal from the parking detecting switch 55 as used in the illustrated embodiment. In operation of the vehicle equipped with the air brake system as described above, compressed air is supplied to the brake pipe and brake chamber upon depression of the brake pedal, and the selector lever 21 is operated to the parking position in this condition. As a result, the switching valve 60 is closed in response to a signal from the parking detecting switch 55, so that the compressed air is trapped or confined in the brake pipe and brake chamber, to maintain the braking force during parking of the vehicle. While the switching valve 60 is provided only in the brake pipe 29 for the rear wheels in the illustrated embodiment, a similar valve may be also provided in the brake pipe for the front wheels.

Figure 3:
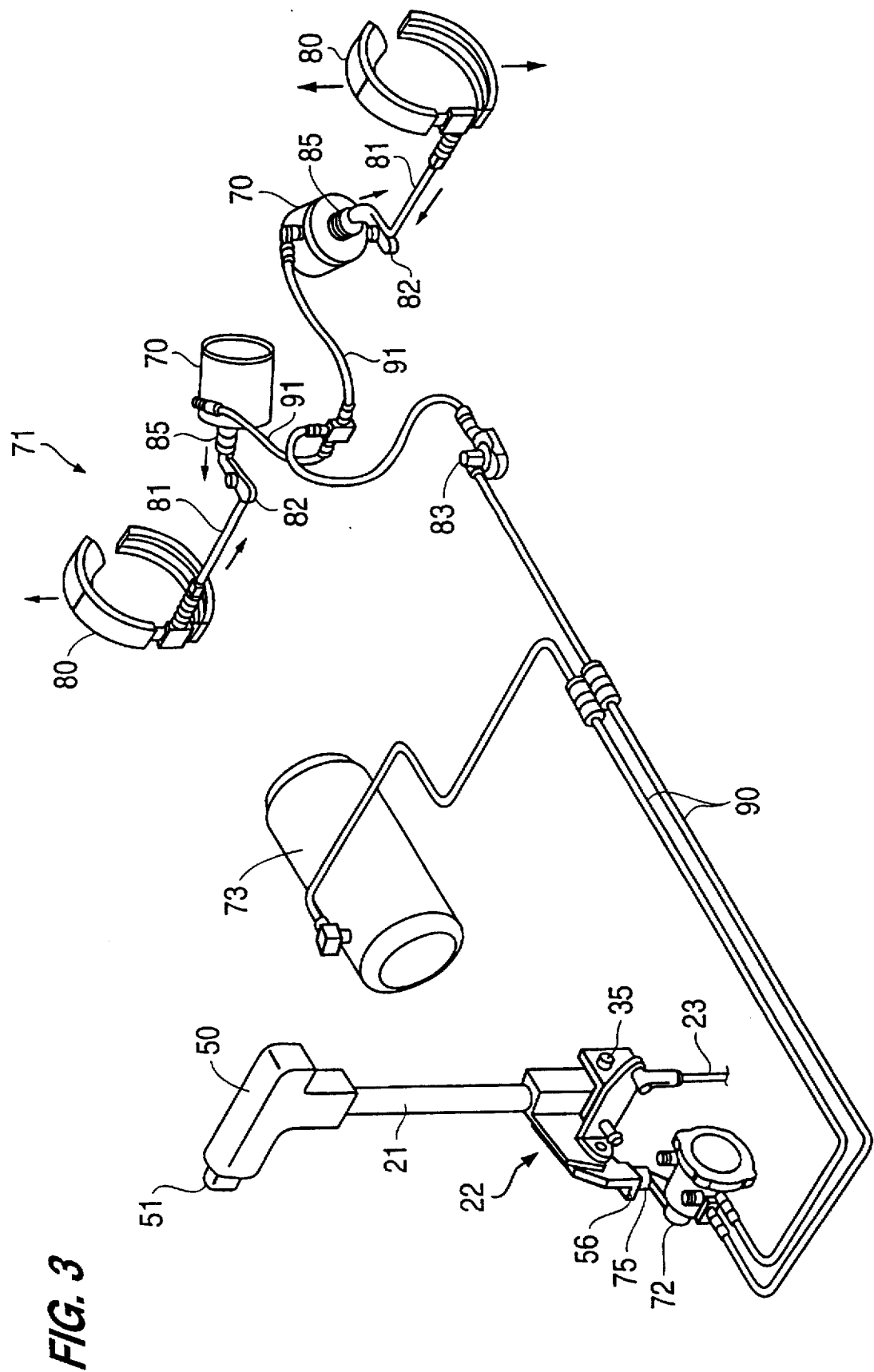
FIG. 3 is a perspective view showing a brake apparatus constructed according to another embodiment of the present invention.

FIG. 3 shows another embodiment of the present invention, which is provided with a pneumatic wheel-parking system 71 having a pair of spring chambers 70, and a control valve 72 that is operated by a selector lever 21. The control valve 72 is disposed between an air tank 73 in which air compressed by a known pump (not shown), for example, is stored, and the spring chambers 70, and an operating portion 75 of the control valve 72 is disposed in the vicinity of a base portion 56 of the selector lever 21. When the selector lever 21 is placed into the parking position P, the operating portion 75 is pushed by the base portion 56 of the selector lever 21.

The selector lever 21 of the present embodiment has a lock mechanism 40 similar to that of the previous embodiment as shown in FIG. 2. The lock mechanism 40 inhibits the selector lever 21 from being shifted from the neutral position N to the reverse position R, from the reverse position R to the parking position P, and from the parking position P to the reverse position R, unless the operating member 51 is pushed so as to release the locked or engaged state of the lock mechanism 40. This mechanism 40 is also constructed such that the selector lever 21 is not locked, or is allowed to be freely moved when the lever 21 is shifted between the drive position D and the neutral position N.

The above-indicated wheel-parking system 71 having the spring chambers 70 includes brake shoes 80 adapted to move radially outwards to come into contact with brake drums (not shown), shoe driving members 81, links 82 and a quick release valve 83.

In each of the spring chambers 70 are accommodated a diaphragm and a strong spring that are not shown in FIG. 3. When the air pressure in the spring chamber 70 does not reach a predetermined value, the above-indicated spring in the chamber 70 pushes a corresponding rod 85 to protrude the rod 85 from the spring chamber 70. As a result, the driving member 81 is displaced through the corresponding link 82 to increase the diameter of the brake shoe 80, that is, to apply a braking force to a corresponding one of the real wheels.

When compressed air having a pressure greater than the above-indicated predetermined pressure is supplied to the spring chamber 70 through air pipes 90, 91, the diaphragm in the chamber 70 is displaced against the force of the spring so that the rod 85 is retracted into the spring chamber 70. As a result, the driving member 81 is displaced through the corresponding link 82 in such a direction that the brake shoes 80 are spaced apart from the brake drum, namely, the braking force to the rear wheel is released.

The control valve 72 is constructed such that the compressed air in the air tank 73 is supplied to the spring chambers 70 when the operating portion 75 of the valve 72 is not pushed by the base portion 56 of the selector lever 21, namely, when the selector lever 21 is placed in a position other than the parking position. If the selector lever 21 is operated to the parking position, on the other hand, the operating portion 75 is pushed to discharge the air in the air pipes 91 and spring chambers 70. As a result, the shoe driving members 81, links 82 and others are moved in the directions as indicated by arrows in FIG. 3, due to the force of the springs incorporated in the spring chambers 70, to increase the diameter of the brake shoes 80 thereby to apply braking forces to the rear wheels.

The wheel-parking system 71 of the present embodiment is also able to produce an appropriate braking force when the selector lever 21 is operated to the parking position while the vehicle is being parked. Namely, a heavy-load vehicle, such as a truck, work vehicle or industrial vehicle, may be provided with a parking position to which the selector lever 21 can be operated as if that of a passenger car were operated. Thus, the selector lever 21 of the above-indicated kind of vehicle may be operated in the same manner as that of the passenger car. Further, the use of the wheel-parking system 71 having the spring chambers 70 makes it possible to eliminate a known mechanical parking brake system using a parking brake lever, for example.

According to the present invention, a middle- or large-size truck may be provided with a parking position that effectively produces a braking force during parking of the vehicle, though it has been difficult to provide the above kind of vehicle with a conventional parking position. Thus, the selector lever of the truck or other heavy-load vehicle may be operated in the same manner as that of a passenger car. In this case, the selector lever can be locked in the parking position by means of the lock mechanism. Where the vehicle with a PTO mechanism utilizes the power of the vehicle engine to perform work or operations, therefore, the selector lever may be placed and locked in the parking position.

What is claimed is:

1. A braking apparatus of a motor vehicle equipped with an automatic transmission, comprising:

a spring chamber including a spring for biasing a wheel brake in a direction in which said wheel brake applies a braking force to a corresponding wheel, said spring chamber inhibiting said wheel brake from applying the braking force against a bias force of said spring, upon application of a pneumatic pressure from a compressed air supply to the spring chamber;

a shift operating unit including a selector member placed in a selected one of shift positions including a parking position for establishing a selected one of shift positions ranges of the automatic transmission; and a control valve disposed between said compressed air supply and said spring chamber, said control valve being selectively placed in a first state wherein the spring chamber communicates with the compressed air supply, and a second state wherein an air in the spring chamber is discharged, said control valve being placed in said second state when said selector member is in said parking position, and placed in said first state when the selector member is in a position other than said parking position, and wherein said control valve includes an operating portion that is mechanically moved along with said selector member so that the control valve is switched to said second state when the selector member is in said parking position, and switched to said first state when the selector member is in said position other than said parking position.

* * * * *